United States Patent [19]
Fukano

[11] Patent Number: 4,512,193
[45] Date of Patent: Apr. 23, 1985

[54] ACCELEROMETER

[75] Inventor: Michio Fukano, Kuroiso, Japan

[73] Assignee: Kabushiki Kaisha Tokyo Keiki, Tokyo, Japan

[21] Appl. No.: 426,735

[22] Filed: Sep. 29, 1982

[30] Foreign Application Priority Data

Nov. 25, 1981 [JP] Japan ................................ 56-188924

[51] Int. Cl.³ ............................................ G01P 15/13
[52] U.S. Cl. .................................................. 73/517 B
[58] Field of Search .......... 73/517 R, 517 AV, 517 B, 73/519, 517 A, 514, 516 R

[56] References Cited

U.S. PATENT DOCUMENTS

| 2,963,671 | 12/1960 | Di Giovanni | 73/517 R X |
| 3,513,711 | 5/1970 | Rogall et al. | 73/517 B |
| 3,680,393 | 8/1972 | Rogall | 73/517 B |

FOREIGN PATENT DOCUMENTS

| 0785212 | 10/1957 | United Kingdom | 73/517 R |
| 0679882 | 8/1979 | U.S.S.R. | 73/517 R |

Primary Examiner—James J. Gill
Attorney, Agent, or Firm—Hill, Van Santen, Steadman & Simpson

[57] ABSTRACT

An accelerometer including a flexible pivot, a base to which one end of the flexible pivot is fixed, a pendulum fixed to the other end of the flexible pivot, a pair of torquers generating a torque in proportion to the acceleration applied through the base to the pendulum, and a displacement detecting device for electrically detecting a relative displacement of the pendulum to the base is disclosed, in which the above-mentioned base consists of first and second frames. The first frame is provided with a fixing part to which one end of the flexible pivot is fixed, a fixing portion to which the displacement detecting device is fixed, and an engaging portion to be engaged with an engaging portion provided on the second frame, whereby the assembly of the accelerometer can be made simplified and easy. The accelerometer of this invention is simple in construction and maintains its characteristics unchanged for a long period of time.

4 Claims, 4 Drawing Figures

ACCELEROMETER

BACKGROUND OF THE INVENTION

1. Field of the Invention

The present invention relates generally to an accelerometer and is directed more particularly to a servo accelerometer.

2. Description of the Prior Art

In a prior art servo accelerometer compact in size and high in accuracy, since the relative position between the torquer coil of a pendulum for detecting acceleration and the magnet of a torquer and the positional relation of the displacement detecting device to the pendulum for detecting a displacement of the pendulum exert much on the performance of the accelerometer, there are many problems such as to make the working accuracy of its parts high, to employ special jigs at the assembling process, to require skillfulness and much time and so on.

Further, there has been proposed a servo accelerometer which uses a pair of torquers so as to improve the performance thereof. In such prior art servo accelerometer, in order to assemble many parts such as magnetic circuits, each forming the torquer and consisting of a torquer coil, torquer magnet, pole and yoke, a displacement detecting apparatus for detecting the displacement of the pendulum and so on to a base supporting the pendulum under the matched state, a number of parts for the matching such as a bush, a reamer bolt and so on are required which must be worked with high accuracy. The scattering of such parts for the matching and the scattering of the parts per se for the matching much influence on the performance of the servo accelerometer. Further, the performance of the servo accelerometer is deteriorated by the secular variation of the parts used for the matching.

OBJECTS AND SUMMARY OF THE INVENTION

Accordingly, an object of the present invention is to provide a novel accelerometer free from the defects inherent to the prior art.

Another object of the invention is to provide a servo accelerometer employing a pair of torquers less in number of constructional parts.

A further object of the invention is to provide an accelerometer which can operate stably in a long period of time without being deteriorated in characteristics.

A still further object of this invention is to provide an accelerometer which can operate even for the deformation of its constructive parts caused by variations in its circumference, temperature and so on.

A yet further object of the invention is to provide an accelerometer which is stable for vibrations, impacts and so on which will be applied thereto.

The other objects, features and advantages of the present invention will become apparent from the following description taken in conjunction with the accompanying drawings through which the like references designate the same elements and parts.

DESCRIPTION OF THE PREFERRED EMBODIMENT

The present invention will be hereinafter described with reference to the attached drawings.

Figure 1:
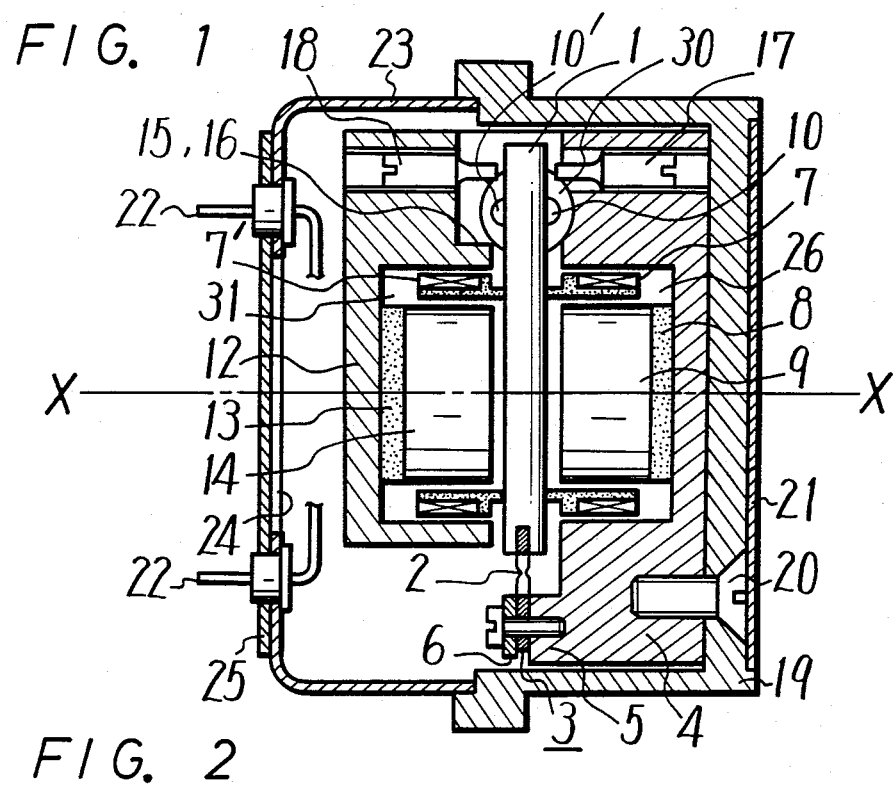
FIG. 1 is a cross-sectional view showing an example of the accelerometer according to the present invention.
Figure 2:
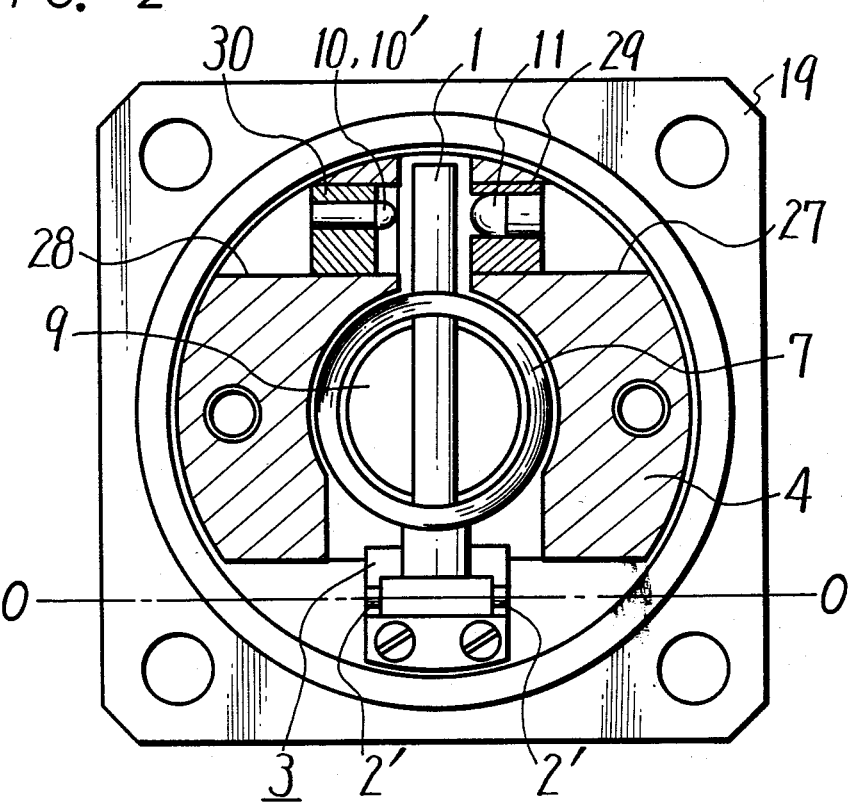
FIG. 2 is a front view thereof with a part in cross-section.

FIG. 1 shows an embodiment of the servo accelerometer (which will be hereinbelow called simply as an accelerometer) according to the invention and FIG. 2 is the perspective view thereof with a part being cut away. In the figures, reference numeral 1 designates a pendulum of, for example, a rod-shape used to detect an acceleration applied thereto. This pendulum 1 is supported by a flexible pivot such as a hinge 3 having a thin portion or flexible portion 2. The pendulum 1 can be rotated or vibrated with the thin portion 2 of the hinge 3 as the fulcrum only in a direction X—X parallel to the plane of the sheet of FIG. 1. One or free end portion of the hinge 3 is firmly attached by, for example, a screw to a first base or frame 4 at its hinge attaching portion 5 through a hinge urging plate or washer 6. Two or pair of cylindrical torquer coils 7 and 7' are attached to the pendulum 1 perpendicular to an axis 0—0 which is the rotational axis of the thin portion 2 of the hinge 3. A disc-shaped permanent magnet 8 and a cylindrical pole piece 9 are attached by, for example, adhesive to the first frame 4 in such a manner that they are located within one torquer coil 7 but without being contacted therewith. This first frame 4 is the main part of this invention and made of electromagnetic, for example, soft iron so that the first frame 4 forms a magnetic circuit between it and the pole piece 9 by the magnet 8 and hence serves as a yoke (return path) and also forms one torquer together with the torquer coil 7. The first frame 4 is attached with a displacement detecting apparatus or device for detecting a displacement of the pendulum 1 which consists of two light receiving elements 10, 10' and a light emitting element 11.

A second base or frame 12 is provided, which is also the main part of this invention same as the first frame 4 and made of electromagnetic, for example, soft iron. To this second frame 12 attached or bonded are a permanent magnet 13 and a pole piece 14 without being contacted with the torquer coil 7' but within the same. Thus, this second frame 12 also forms a magnetic circuit between the permanent magnet 13 and pole piece 14. Thus, the other torquer is formed by the elements 7', 12, 13 and 14.

The first frame 4 is provided with an engaging portion or hole 15 which receive an engaging portion or projection 16 of the second frame 12 so that both frames 4 and 12 are coupled integrally.

The first frame 4 and second frame 12 are respectively provided with stoppers 17 and 18 for limiting the operating range of the pendulum 1. When the stoppers 17 and 18 are respectively rotated by screws or the like, the above operating range of the pendulum 1 can be freely adjusted.

The parts mentioned above already form the accelerometer of perform the function of the accelerometer. These parts are fixed to a case 19 by a plurality of screws 20 to be a unitary body with the case 19, and a character name plate 21 is bonded thereto. Then, the inside of the case 19 is made to be kept in air-tight.

External terminals 22 such as lead wires (not shown) serving to take out the electrical signal from the light receiving elements 10, 10' and so on, to supply feedback currents to the torquer coils 7, 7' and so on are attached or bonded to a terminal case 23 in air-tight, and in turn the terminal case 23 is attached to the case 19 in air-tight such that one ends of the terminals 22 are located within the case 19. Through a central aperture 24 of the terminal case 23, the electrical connection of the parts or devices within the case 19 and so on are performed. Thereafter, while the air within the case 19 is exhausted for the inside of the case 19 to be vacuum or inert gas (for example, helium gas) or the like is charged into the inside of the case 19, a lid 25 is bonded to the aperture 24 to thereby keep the inside of the case 19 in air-tight. Thus, the parts or devices within the case 19 are prevented from being deteriorated or the performance of the accelerometer can be maintained stable for a long time of period.

With the accelerometer of the present invention constructed as mentioned above, when acceleration is applied thereto in the direction of the central axis X—X of the case 19, the pendulum 1 is displaced slightly about the thin portion 2 of the hinge 3 as the fulcrum. Thus, the amount of the light incident from the light emitting element 11 to the light receiving elements 10 and 10' of the displacement detecting device through or divided by the pendulum 1 is varied, so that from the light receiving elements 10 and 10' derived is the electrical signal corresponding to the displacement of the pendulum 1. Then, the current in proportion to the above electrical signal is supplied or fed back to the torquer coils 7 and 7' whereby the pendulum 1 is restricted to make the output electrical signal from the light receiving elements 10 and 10' zero. Since the electrical signal i.e. restricting current is in proportion to the acceleration applied to the accelerometer, this applied acceleration can be known by measuring the above current, as well known.

Figure 3:
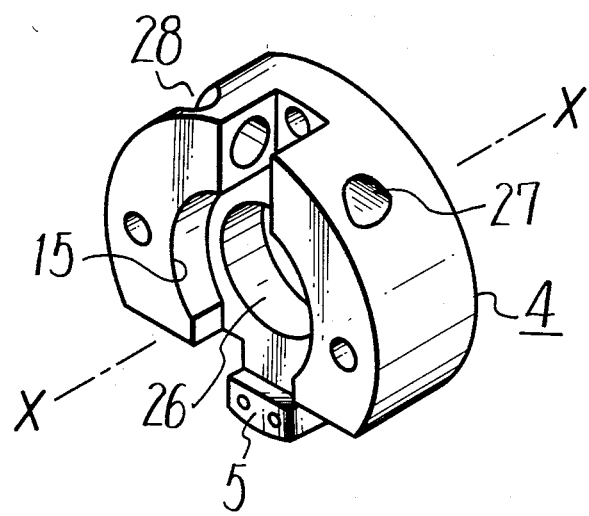
FIGS. 3 and 4 are each a perspective view showing a main part of the accelerometer of this invention shown in FIG. 1.
Figure 4:
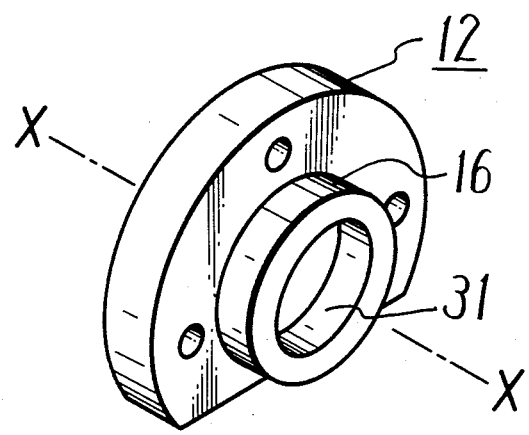

FIGS. 3 and 4 are views respectively illustrating the first and second frames 4 and 12 which are to be integrally assembled and main parts of this invention. As shown in FIG. 3, the first frame 4 is of a cylindrical shape which is provided on its one side surface with the afore-mentioned engaging portion or hole 15 with the axis coincident to that X—X and also formed with another hole 26 with the axis coincident to the central axis (X—X) of the hole 15 to establish the magnetic circuit of the torquer 7. As shown in FIG. 1 clearly, the hole 26 is not a through-bore but its one end opening is closed. That is, on the bottom of the hole 26 fixed is the permanent magnet 8 on which the pole piece 9 is fixed coaxially with the hole 26. As shown in FIG. 3, the hinge attaching portion 5 is formed integrally with the first frame 4 and is worked to have its plane correctly perpendicular to the axis X—X (along which the acceleration is applied or acceleration input axis). Apertures 27 and 28 are also bored through the first frame 4 such that their axes are equal with each other and also perpendicular to the axis X—X. A lamp holder 29 for the light emitting element 11 of the displacement detecting device and a lamp holder 30 for the light receiving elements 10 and 10' of the displacement detecting device, which are shown in FIGS. 1 and 2, are respectively inserted into the apertures 27 and 28.

While, as shown in FIG. 4, the second frame 12 is of a disc shape as a whole and from its one side surface projected is a cylindrical boss or engaging portion 16. This cylindrical boss 16 is inserted into the engaging hole 15 of the first frame 4 so that the first and second frames 4 and 12 are assembled integral to form the above-mentioned two-frame structure.

Through the boss 16, formed coaxially with the axis X—X is a bore 31 which is not a through-bore as shown in FIG. 1. On the bottom of this bore 31 fixed is the permanent magnet 13 on which in turn the pole piece 14 is fixed coaxial with the bore 31. Both the magnet 13 and pole piece 14 are located within the torquer coil 7' without being contacted therewith.

As described above, one of the features of the present invention resides in that the number of the parts composing the accelerometer is reduced; the mechanical working process and the assembling and adjusting work are simplified; and in order to make the characteristics uniform, the frame for supporting the pendulum is formed of two frame members, in which the pendulum and the hinge for supporting pendulum is attached to the first frame member and also the displacement detecting devices for detecting the displacement of the pendulum and so on are also provided in connection with the first frame member, whereby the assembling, matching and adjusting of the respective parts become easy, no special working technique is necessary and hence the accelerometers uniform in characteristics can be easily assembled by simple assembling jig.

Another feature of this invention resides in that the second frame of the accelerometer is such a simple structure that it is integrated with the first frame thereof by the engagement of both the engaging portions of them to establish a pair of the torquer magnetic circuits and that since the pendulum and its displacement detecting device are integrally gathered on the first frame, the accelerometer can keep its stable characteristics over long period of time without change even if the deformation is caused in the parts of the accelerometer by its circumstance, temperature change and so on and also the vibration, impact and so on are exerted on the accelerometer.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. An accelerometer comprising:
   a flexible pivot;
   a first frame to which one end of said flexible pivot is fixed;
   a pendulum, one end of which is fixed to the other end of said flexible pivot;
   a pair of torquers for generating a torque in proportion to an acceleration applied through said first frame to said pendulum;
   a displacement detecting means for electrically detecting a relative displacement between said first frame and said pendulum;
   a second frame engageable with said first frame;
   said first frame having an attaching portion to which said one end of said flexible pivot is fixed, a hole within which one of said pair of torquers is received, a recess within which the other end of said pendulum is movably located without contact therebetween, a pair of apertures into which said displacement detecting means is inserted, and a first engaging portion;

said second frame having a hole within which the other of said torquers is received and a second engaging portion, said first and second frames being coupled through said first and second engaging portions; and said displacement detecting means being formed of a light emitting element inserted into one of said apertures and a light receiving element inserted into the other of said apertures.

2. An accelerometer as claimed in claim 1, in which the first engaging portion of said first frame is a hole provided at the center of the first frame and the second engaging portion of said second frame is a cylindrical projection provided at the center thereof.

3. An accelerometer as claimed in claim 1, in which said first and second frame are both made of magnetic material and serve as magnetic circuits for said pair of torquers.

4. An accelerometer comprising:

a flexible pivot;

a first frame to which one end of said flexible pivot is fixed;

a pendulum, one end of which is fixed to the other end of said flexible pivot;

a pair of torquers for generating a torque in proportion to an acceleration applied through said first frame to said pendulum;

a displacement detecting means for electrically detecting a relative displacement between said first frame and said pendulum;

a second frame engageable with said first frame;

said first frame having an attaching portion to which said one end of said flexible pivot is fixed, an aperture within which one of said pair of torquers is received, a recess within which the other end of said pendulum is movably located, mounting means at said recess for receiving said displacement detecting means such that the detecting means detects movement of the pendulum at said recess, and a first engaging portion;

said second frame having a hole within which the other of said torquers is received and a second engaging portion, said first and second frame being coupled through said first and second engaging portions; and said displacement detecting means comprising a light beam interacting with the pendulum.

* * * * *